Oct. 25, 1938.  J. J. KEYES ET AL  2,134,561
CLUTCH MECHANISM FOR WINDING SPINDLES
Filed Oct. 31, 1936  2 Sheets-Sheet 1

WITNESSES:
Michael Stark
Wm. C. Groome

INVENTORS.
John J. Keyes and
Porter H. Brace.
BY
Paul E. Friedeman
ATTORNEY

Oct. 25, 1938.  J. J. KEYES ET AL  2,134,561
CLUTCH MECHANISM FOR WINDING SPINDLES
Filed Oct. 31, 1936    2 Sheets-Sheet 2

WITNESSES:
Michael Stark
Wm. E. Groome

INVENTORS.
John J. Keyes and
Porter H. Brace.
BY
Paul E. Friedemann
ATTORNEY

Patented Oct. 25, 1938

2,134,561

UNITED STATES PATENT OFFICE 2,134,561

CLUTCH MECHANISM FOR WINDING SPINDLES

John J. Keyes, Pittsburgh, and Porter H. Brace, Forest Hills, Pa., assignors to Westinghouse Electric & Manufacturing Company, East Pittsburgh, Pa., a corporation of Pennsylvania Application October 31, 1936, Serial No. 108,558

15 Claims. (Cl. 117—42)

Our invention relates, generally, to clutches and, more particularly, to improvements in the wrapping head structure for wrapping machines.

Wrapping heads of conductor-wrapping machines are designed to operate at comparatively high speeds. During such operation, the wrapping material is supplied to the core being wrapped from a spool of wrapping material mounted concentric of the head and the conductor or core being provided with the wrapping material. The spool for supplying the wrapping material to the conductor is so mounted that it may rotate with reference to the flyer support. In operation, that is, conventional operation, the spool will have a speed always somewhat greater than the flyer. The speed differential will depend on the size of the spool, namely, the quantity of paper, or other wrapping material, on the spool.

To prevent a too free relative movement between the flyer and the spool, the spool should be restrained in its movement relative the flyer. The force with which the spool is restrained in its movement relative to the flyer determines the tension with which the material is wrapped on the conductor.

A full spool naturally has the covering material removed therefrom at a much greater distance from its center and the moment arm is much greater. A constant restraining force will thus by no means produce a constant tension in the wrapping material. Further, an empty spool is much less in weight so that, if a frictional restraining force is used, the restraining force will vary with the size, or weight, of the spool. The tension in the wrapping material, in the absence of our invention, thus varies with the weight and the size or diameter of the spool for a given coefficient of friction.

One object of our invention is to maintain constant tension in the wrapping material during wrapping of the material about the core.

Another object of our invention is to automatically vary the torque transmitted by a magnetic clutch so that the force at any moment arm with reference to the axis of the driven member is substantially constant.

A still further object of our invention is to provide for a transmission of a substantially constant force at varying radii, as well as at a fixed radius, of a driven portion of a magnetic clutch substantially independent of the force tending to move the clutch elements toward each other.

A more specific object of our invention is to maintain substantially constant tension in a strand of material being unwound from a spool regardless of the diameter of the spool from which it is wound.

Other objects and advantages of our invention will become more apparent from a study of the following specification when considered in conjunction with the accompanying drawings, in which.

Figure 1:
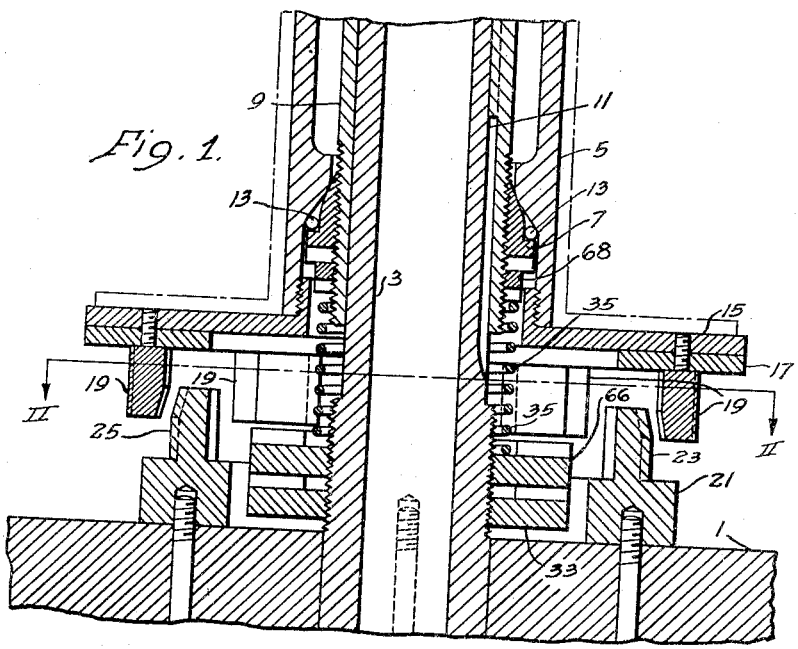
Figure 1 is a vertical sectional view of our invention and shows a spool support of a core wrapping head for a wrapping machine such as is disclosed in the copending application for Letters Patent of John J. Keyes entitled "Stop control means for core wrapping machines", filed November 5, 1935, Serial No. 48,329.

Referring to Fig. 1, reference character 1 designates the base of a flyer, that is, 1 represents a supporting disk for the spool carrying the wrapping material that is used in connection with the application of insulation to a core, or electrical conductor. The spool is merely indicated in dotted lines because the spool itself does not constitute part of our invention.

The base 1 is rigidly secured to the hollow shaft 3 in any suitable manner and thus rotates with the shaft. The core to be wrapped passes through the hollow shaft 3 and is provided with the wrapping material at the top of the flyer by a suitable wrapping head not constituting part of our invention.

The spool itself fits snugly on a sleeve 5. The race 7 of the ball bearings is screw-threaded to a second sleeve 9 keyed to the hollow shaft 3. As indicated at 11, the keyway is loose to thus permit free vertical movement of the sleeve 9 and the associated parts as sleeve 5 carrying the spool, ball bearings 13 and race 7, all carried by sleeve 9.

The lower end of sleeve 5 has a table 15 rigidly secured thereto by the threaded engagement shown. The lower surface of the table is provided with an annulus 17 of magnetic material. To this annulus are secured a plurality of lugs 19 of magnetic material. These lugs and annulus are preferably of soft iron so that they may be energized by a permanent magnet.

Disposed on the upper surface of supporting disk 1 is an annulus 21 having a pair of lugs or integral projections. This annulus 21 is magnetized to thus present a permanent magnet having the lugs 23 and 25 as poles of opposite polarity. The lugs 23 and 25 and the lugs 19 have beveled regions 27, 29 and 31, respectively. These beveled regions are disposed in a facing relation and, since the lugs 19 and 23 and 25 are rigidly mounted on their respective supports, movement of table 15 away from disk 1 increases the air-gap between the lugs.

By suitable design of the lugs and their beveled edges, the magnetic drag between disk 1 and table 15 may be readily controlled for varying positions of table 15 with reference to disk 1.

Disposed on the shaft 3 is an adjusting nut 33 for adjusting the force of compression of spring 35. Spring 35 is disposed between the nut 33 and the table 15 and thus controls the air-gap between the lugs 19 and 23 and 25. By a suitable selection of the spring 35, the adjustment of nut 33 and the design of the lugs and their beveled faces all in relation to the varying weight of the spool of material disposed on the table, the tension of the strand being removed from the spool may be kept constant regardless of the amount of material on the spool.

When a new and thus full spool is first put on table 15 the spring 33 will be compressed a maximum so that the size of the air-gap is normally decreased. The magnetic drag on the table 15 as it rotates with reference to disk 1 is thus a maximum. The moment arm at which the material is removed is, however, also a maximum. Since this maximum drag and maximum moment arm have opposite effects on the tension on the strand being removed from the material, the tension may be caused to remain constant even though the moment arm decreases with the removal of more and more material from the spool and even though the magnetic drag decreases as the air-gap increases. The air-gap will, of course, change with changes in the size of the spool because a full and thus heavy spool will compress spring 33 more than a more nearly empty and thus lighter spool.

The variation in the size of the air gap is not necessarily proportional to the deflection of spring 35. By a proper design of the beveled edges on the lugs 19 and 23 and 25 and the proper selection of the characteristics and adjustment of spring 35 relative to the variations in weight of a spool the tension in the strand can be controlled as desired.

Figure 2:
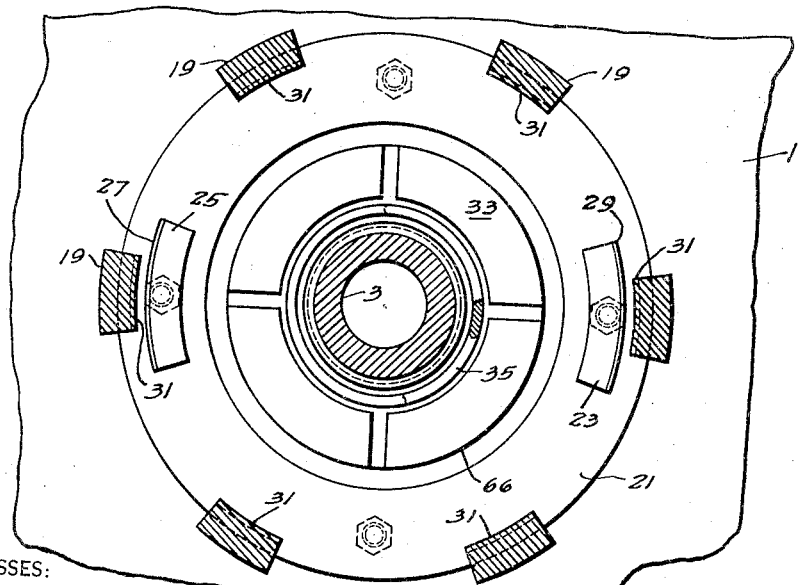
Fig. 2 is a plan view, along the section line designated II—II, of the subject matter shown in Fig. 1.
Figure 3:
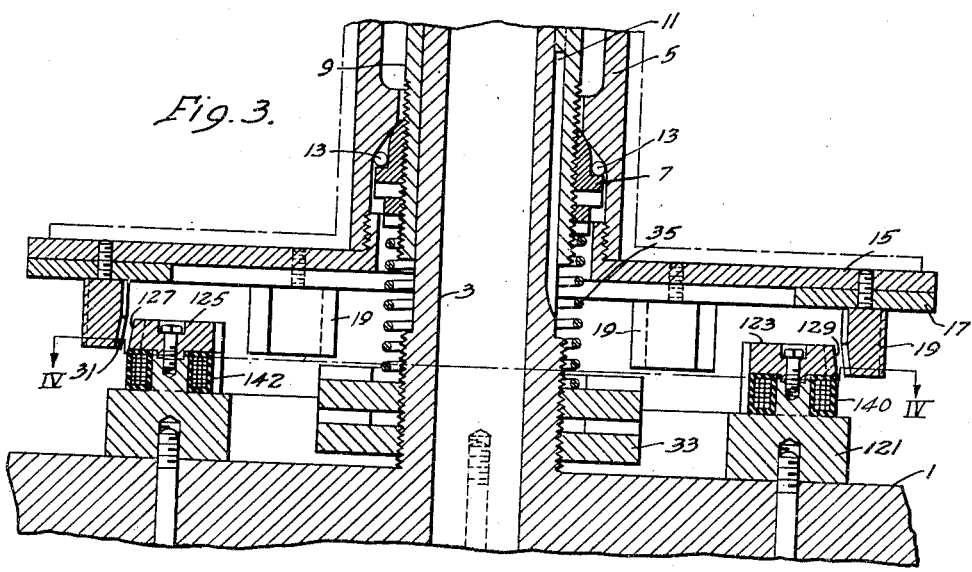
Fig. 3 is a vertical sectional view, somewhat like the showing in Fig. 1, of a modification of our invention.
Figure 4:
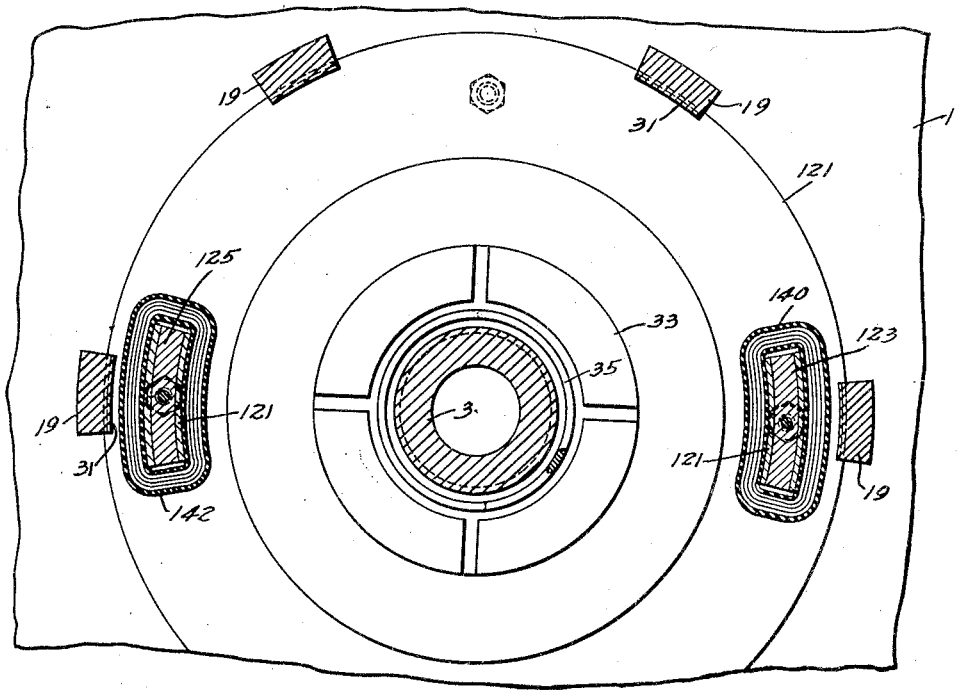
Fig. 4 is a view along the section line designated IV—IV of the subject matter shown in Fig. 3.

In the modification shown in Figs. 3 and 4 most of the structure is exactly as in Figs. 1 and 2 and the elements that are the same have been given the same reference characters. The control of the tension in the strand being unwrapped from the spool is somewhat different. The annulus 121 is provided with removable shoes 123 and 125 that are provided with beveled edges 129 and 127 as the lugs 23 and 25, but each of the lugs 123 and 125 is provided with one or more turns of an electric circuit short circuited upon itself. These circuits, or coils 140 and 142, are made adjustable to thus have suitable electrical characteristics so that the tension in the strand being unwound may be kept at any desired value for an entire unwinding cycle.

We are, of course, aware that others, particularly after having had the benefit of the teachings of our invention, can devise other clutch means for providing a restraining force for the spool support to thus control the tension in the material being unwrapped from the spool disposed on the spool support. We desire to be limited only by the scope of the appended claims and such prior art as may be pertinent.

We claim as our invention:

1. In a serving apparatus for a core wrapping machine, a driving element, a driven element carrying material to be served to a core having relative movement to the driving element, magnetic means intermediate said elements adapted to communicate power to the driven element from the driving element, and means for varying the magnetic characteristics of said magnetic means so as to vary the amount of power transmitted from the driving element to the driven element in substantially inverse relation to the relative speed between the driven and driving elements.

2. In a serving apparatus for a core wrapping machine, a driving means for a wrapping head of the machine, a material supporting member mounted to be driven by said driving means, said material supporting member being so mounted with reference to the driving means that the distance between the said means and the said member is inversely proportional to the amount of material on the said member, and magnetic control means, disposed between the said means and the said member responsive to the relative disposition of the means and member, adapted to restrain the movement of the member relative the means by a constant force.

3. In a serving apparatus for a core wrapping machine, a driving means for a wrapping head of the machine, a material supporting member mounted to be driven by said driving means, said material supporting member being so mounted with reference to the driving means that the distance between the said means and the said member is inversely proportional to the amount of material on the said member, and electromagnetic control means, disposed between the said means and the said member responsive to the relative disposition of the means and member, adapted to restrain the movement of the member relative the means by a constant force.

4. A clutch mechanism, in combination, a vertical shaft, a magnetic member rigidly secured to the shaft; a second magnetic member, disposed above said first member and urged toward the first member by a force varying from a given maximum to a given minimum, adapted to be driven by the first magnetic member; means for exerting a force on the second member at varying distances from the axis of the shaft; and means disposed between the members tending to separate them by a force that varies with the force urging the second member toward the first, whereby the force acting in a plane at right angles to the axis of the shaft and on the second member at varying distances from the axis of the shaft is maintained substantially constant.

5. In a serving apparatus for a core wrapping machine, in combination, a hollow shaft surrounding a core to be wrapped with material, a support for a spool of material disposed to rotate about the shaft, electromagnetic means including elements mounted on the shaft and support, respectively, for restraining the rotation of the support, and means for varying the restraining force so that the material is taken from the spool at substantially constant tension regardless of the size of the spool.

6. In a serving device for a core wrapping machine, in combination, a hollow vertically disposed shaft through which the core to be wrapped may be passed, a permanent magnet having opposite poles symmetrically disposed with reference to the axis of the shaft, a material supporting table having wrapping material wound thereon disposed above the magnet and loosely mounted on the shaft and subject to rotation by the unwinding force of the material as it is unwound from the supporting table, said unwinding force, of course, acting with a varying moment arm as more and more material is unwound, a plurality of soft iron lugs mounted on the bottom of the table and adapted to coact with the permanent magnet to restrain the movement of the table relative the shaft, said poles of the permanent magnet and lugs of soft iron being so shaped that the table may be restrained by a constant force as the moment arm at which the unwinding force may act on the table and the air-gap between the magnet poles and soft iron lugs decreases.

7. In a serving device for a core wrapping machine, in combination, a vertically disposed hollow shaft through which a core to be wrapped passes, means, for supporting wrapping material, disposed concentric of the shaft, said means being adapted to rotate with reference to the shaft whereby the material wound about a portion of the support may be unwound during the core rewrapping operation, a magnetic brake for restraining the freedom of the rotation of the support relative to the shaft whereby the tension in the material being unwrapped may be controlled and means responsive to the amount of material on the support adapted to vary the braking effect of said magnetic brake.

8. In a serving device for a core wrapping machine, in combination, a vertically disposed hollow shaft through which a core to be wrapped passes, means, for supporting wrapping material, disposed concentric of the shaft, said means being adapted to rotate with reference to the shaft whereby the material wound about a portion of the support may be unwound during the core wrapping operation, and a magnetic brake for restraining the freedom of the rotation of the support relative to the shaft whereby the tension in the material being unwrapped may be controlled.

9. In a serving device for a core wrapping machine, in combination, a vertically disposed hollow shaft through which a core to be wrapped may be passed, means for supporting the wrapping material concentric of the shaft, said means being adapted to rotate about the shaft whereby the material wound about a portion of the support may be unwound during the core wrapping operation, and electro-inductive means adapted to control the rotation of the support on the shaft whereby the tension in the material being unwrapped may be controlled.

10. In a serving device for a core wrapping machine, in combination, a vertically disposed hollow shaft through which a core to be wrapped may be passed, means for supporting the wrapping material concentric of the shaft, said means being adapted to rotate about the shaft whereby the material wound about a portion of the support may be unwound during the core wrapping operation, electro-inductive means adapted to control the rotation of the support on the shaft whereby the tension in the material being unwrapped may be controlled and means, responsive to the amount of material on the support, adapted to control the effect of said electro-inductive means.

11. In a serving apparatus for a core wrapping machine, in combination, a vertically disposed hollow shaft through which the core to be wrapped passes, a support mounted on the shaft and adapted to rotate about the shaft, electro-inductive means for causing the support to rotate, at a slip, with the shaft, said electro-inductive means comprising an element fixed to the shaft and an element fixed to the support, and means disposed between the elements for controlling the driving force between the shaft and support as a function of the amount of material on the shaft.

12. In a serving apparatus for a core wrapping machine, in combination, a vertically disposed hollow shaft through which the core to be wrapped passes, a support for the wrapping material mounted on the shaft and adapted to rotate about the shaft, electro-inductive means including an element fixed on the shaft and one element fixed to the support for causing a resistance to rotation of the support on the shaft, and means for varying the effect of said electro-inductive means.

13. In a serving head for serving a strand of material, as described, in combination, a vertically disposed rotatable shaft, a cop spindle rotatably mounted on the shaft and adapted to receive a spool of strand material which varies in size from a full spool to an empty spool during the operation of the serving head, spring means disposed between the rotatable shaft and the cop spindle and adapted to vary the vertical position of the cop spindle with reference to the shaft as the amount of strand material on the spool varies, and means, responsive to the vertical shift of the cop spindle with reference to the shaft, adapted to subject the cop spindle to a substantially constant resistance to rotation on the rotatable shaft.

14. In a serving head for serving strand material to a core in the manner described, in combination, a rotatable shaft, a magnet mounted on the shaft, a cop spindle rotatably mounted on the shaft and disposed to be restrained in its rotation by the magnet mounted on the shaft, and means, responsive to the amount of material on the cop spindle, adapted to vary the restraining effect of the magnet on the cop spindle.

15. In a serving head for serving wrapping material to be wrapped about a core, in combination, a hollow rotatable shaft through which the core to be wrapped passes, a plate fixed on the shaft, a cop spindle rotatably and longitudinally movable on the hollow shaft adapted to carry wrapping material, a magnetic coupling having elements mounted on the plate and cop spindle, respectively, adapted to restrain the rotation of the cop spindle with reference to the plate, and means, responsive to the weight of the cop spindle and the material, disposed between the cop spindle and plate adapted to vary the distance between the plate and cop spindle to thus vary the effect of the magnetic coupling.

JOHN J. KEYES.
PORTER H. BRACE.